United States Patent [19]

Landmeier

[11] Patent Number: 4,659,874

[45] Date of Patent: Apr. 21, 1987

[54] X-Y POSITION SENSOR

[75] Inventor: Waldo L. Landmeier, Phoenix, Ariz.

[73] Assignee: Sanders Associates, Inc., Nashua, N.H.

[21] Appl. No.: 779,350

[22] Filed: Sep. 23, 1985

[51] Int. Cl.⁴ .............................................. G08C 21/00
[52] U.S. Cl. ..................................................... 178/19
[58] Field of Search ............................ 178/18, 19, 20; 340/347 AD, 365 C; 382/9, 23

[56] References Cited

U.S. PATENT DOCUMENTS 4,087,625  5/1978  Dym et al. ........................... 178/19

Primary Examiner—Stafford D. Schreyer
Attorney, Agent, or Firm—William F. Porter, Jr.

[57] ABSTRACT

In a sketch pad embodying the present invention, the sensing pad has an array of generally parallel pairs of adjacent sensing conductors which, for the purpose of this explanation, will be condidered as extending in the horizontal or X direction. Each conductor has a generally triangular shape, with the base of the triangle at one edge of the pad and the apex at the opposite edge. The conductors in each pair are complementary, that is, their bases are at opposite edges of the pad. Preferably the stylus used with the sensing pad has an electrode at its tip to which it applies an alternating current signal at a frequency that is suitably high for capacitive coupling to the sensing pad. To ascertain the X position of the stylus on the pad, the right or left set of conductors is connected to sensing circuitry and the other of these two sets is grounded. The sensed voltage then corresponds to the X position. Specifically, if the right set of conductors is connected to the sensing circuitry and the left set is grounded, the energy coupled to the right set from the signal emitted by the stylus corresponds to the relative widths, i.e. in the Y direction, of the right set of conductors at the position of the stylus. Thus the senses signal increases in intensity with the X coordinate of the stylus position.

3 Claims, 2 Drawing Figures

X-Y POSITION SENSOR

BACKGROUND OF THE INVENTION

This invention relates to a low-cost X-Y position sensor. More particularly it relates to a so called "sketch pad" that transmits to a digital computer signals indicative of the position of a stylus that is manually moved over the surface of a planar sensing pad. Sensing conductors on the pad are formed in a single layer on the pad and the signals induced in them or transmitted by them are sensed by analog circuitry whose output is converted to digital signals representing the X-Y coordinates of the stylus position.

Electronic sketch pads have long been used to provide inputs to digital computers. They are generally used in an interactive mode in which a cursor on a CRT monitor traces a path corresponding to the path of a stylus moved by an operator over a sensing pad. This arrangement can be used to position the cursor at any desired point on the CRT screen or, alternatively, to draw lines on the screen.

These sketch pads are generally of two types. In one the sensing pad contains two conductor grids, one overlying the other, with the conductors in one grid orthogonal to those in the other grid. To sense the position of the stylus, the wires in one of the grids are first energized sequentially and the signal picked up by the stylus from the wires is sensed to indicate which of the wires is in closest proximity to the stylus. This fixes the position of the stylus along one axis. The wires in the second grid are then sequentially energized to ascertain the stylus position along the other axis. This system is capable of high resolution. However, its cost has significantly limited its applicability.

Another sketch-pad arrangement is described by Dym al. in U.S. Pat. No. 4,087,625. This pad uses a single grid of conductors extending from one edge of the pad across to the opposite edge. The conductors are triangular in shape and are conceptually arranged in complementary pairs. Thus, in each pair one of the conductors has its base along one edge of the pad and its apex at the opposite edge, while the other conductor in the pair has its apex at the first edge and its base at the second edge. To determine the position of a stylus along the coordinate extending between these two edges, one of the conductors in each pair is energized and the other conductor is grounded. The signal picked up by the stylus then varies from a minimum at the edge where the apexes of the energized conductors are located to a maximum at the edge where the bases are located.

This system is less costly than the orthoganal grid system described above since it does not require the relatively complex switching circuitry used in the latter system. However determination of the stylus position along the second coordinate requires the application of either a fairly linear resistive conductor along each of the edges of the pad or the use of a second conductive layer, either of which is a significant element of cost.

SUMMARY OF THE INVENTION

In a sketch pad embodying the present invention, the sensing pad has an array of generally parallel pairs of adjacent sensing conductors which, for the purpose of this explanation, will be considered as extending in the horizontal or X direction. Each conductor has a generally triangular shape, with the base of the triangle at one edge of the pad and the apex at the opposite edge. The conductors in each pair are complementary, that is, their bases are at opposite edges of the pad.

Conceptually the conductors may be divided into four sets, a "left" and "right" set and an "ascending" and "descending" set. A left set containing triangular conductors whose bases are on the left edge of the pad and the apex on the right side and a right set containing triangular conductors whose bases are on the right side and the apex is on the left side. The ascending set consists of a vertical series of left and right pairs of complimentary triangles, generally defining rectangles, whose vertical dimension decreases from a maximum at the upper edge of the sensing pad to a minimum at the lower end.

The descending set is interleaved with the ascending set and consists of left and right triangular pairs whose vertical dimensions decrease from a maximum at the lower edge of the pad to a minimum at the upper edge.

Preferably the stylus used with the sensing pad has an electrode at its tip to which it applies an alternating current signal at a frequency that is suitably high for capacitive coupling to the sensing pad. To ascertain the X position of the stylus on the pad, the right sets or left sets set of conductors are selectively connected to sensing circuitry and the others of these two sets are selectively grounded. The sensed voltage then corresponds to the X position. Specifically, if the right sets of conductors are connected to the sensing circuity and the left set are grounded, the energy coupled to the right sets from the signal emitted by the stylus corresponds to the relative widths, i.e. in the Y direction, of the right sets of conductors at the position of the stylus. Thus the sensed signal increases in intensity with the X coordinate of the stylus position.

In similar fashion, to ascertain the Y position of the stylus, the ascending sets of conductors are connected to the sensing circuitry and the descending sets are grounded. Since the widths of the ascending sets increase from a minimum at the bottom edge of the pad to a maximum at the top edge, the sensed voltage increases with the Y coordinate of the stylus position.

With the sensing pad configuration described herein, the X- and Y- coordinate measurements are independent of each other even though the same conductors are used for both the X and Y measurements. Furthermore the conductors are connected on the sensing pad into four sets, with the switching arranged to select array these four sets for connection to the sensing circuitry. This results in a considerably lower cost than those systems that require selection of individual conductors on the sensing pad. Moreover the conductors on the pad are on a single layer, thereby providing a lower cost than prior multi-layer arrangements.

DETAILED DESCRIPTION OF THE PREFERRED EMBODIMENTS

Figure 1:
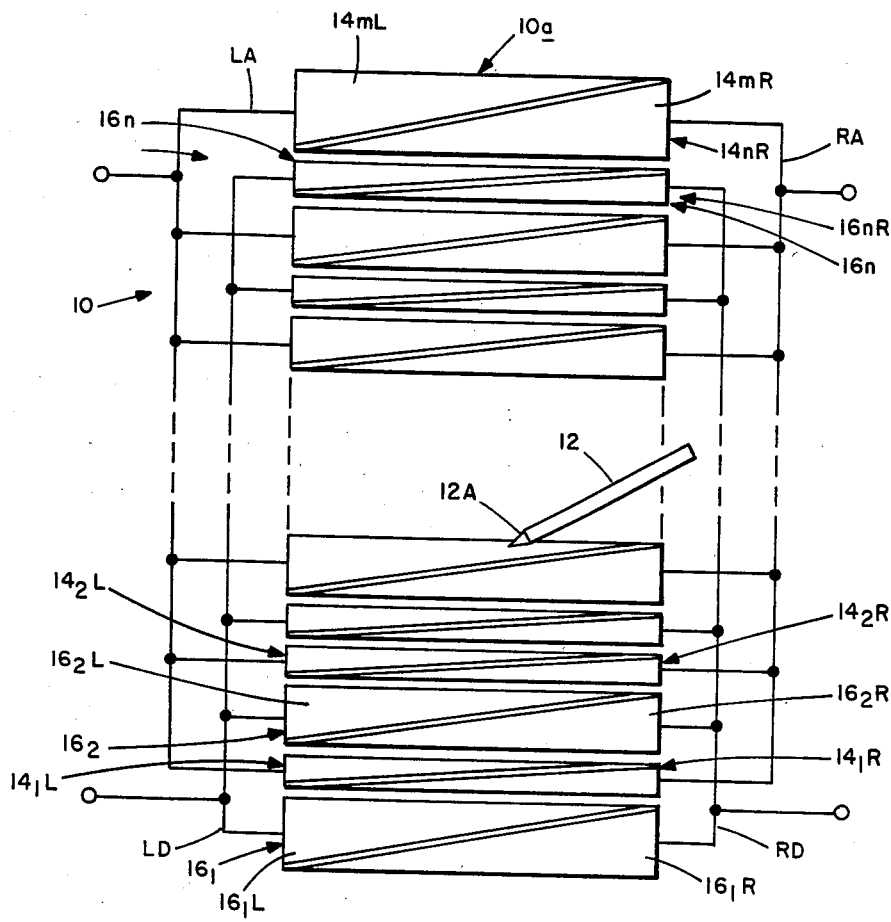
FIG. 1 is a diagram of a sensing pad and stylus used in a position detector embodying the invention.

As shown in FIG. 1 a position sensor embodying the invention comprises a sensing pad generally indicated at 10 and a stylus 12 whose position on the pad is sensed by means of the invention. The pad 10 comprises various conductors, described below, which can be formed in a single layer on a suitable substrate (not shown) by conventional etched circuit techniques. In the preferred embodiment of the invention the stylus includes an alternationing-current generator that applies an AC signal to an electrode in the tip 12A of the stylus and this signal is capacitively coupled to conductors in a sensing area 10A on the pad 10.

More specifically the conductors in the sensing area 10A comprise an ascending set $14_1$–$14_n$ and a descending set $16_1$–$16_n$. The conductors 14 and 16 are triangular in shape and are arrayed in complementary pairs. In each pair the base of one of the triangles is at the left edge of the sensing area and its apex at the right while the other triangle is disposed in the opposite sense. The conductors with their base ends at the left hand edge constitute the "left" set. These conductors are designated with the suffix "L". Those with their bases set, are designated with the suffix "R". In the ascending set 14 the widths of the conductor pairs, i.e. the dimension in the Y direction, increase from minimum at the bottom edge of the sensing area 10A to a maximum at the top. Conversely the widths of the conductor pairs 16 in the descending set decrease from a maximum at the bottom of the sensing area to a minimum at the top.

The conductors 14L, 14R, 16L and 16R are interconnected in four sets which are the intersections of the ascending, descending, right and left sets, namely a right ascending set (RA) consisting of the right hand conductors 14R, a left ascending set (LA) consisting of the conductors 14L, a right descending set (RD) consisting of the conductors 16R and a left descending (LD) set consisting of the conductors 16L. The sensing conductors in each of the latter four sets are connected together by means of conductors RA, LA, RD and LD as indicated. These conductors provide terminals for the connections to the sensing pad.

Figure 2:
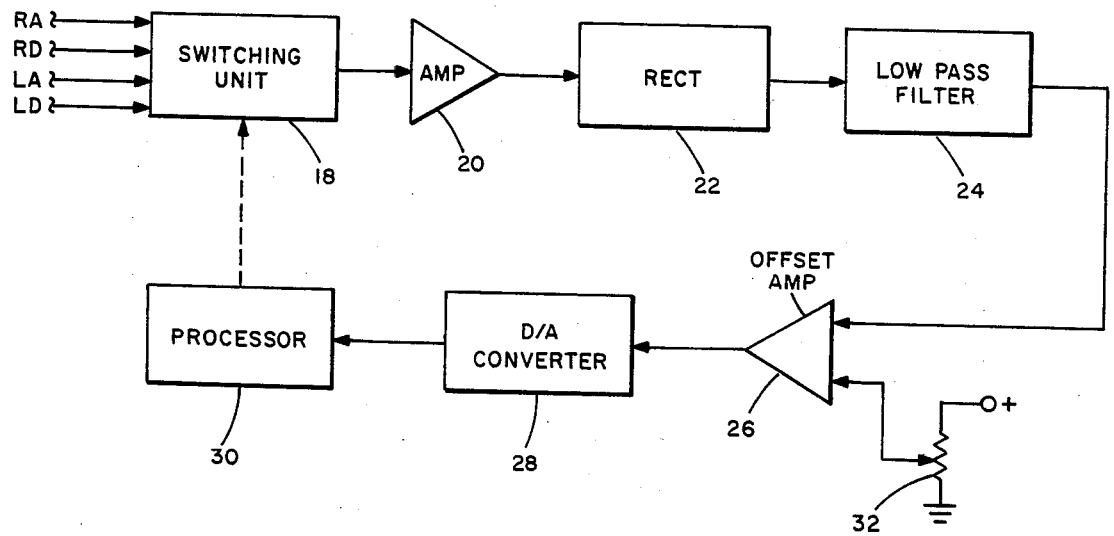
FIG. 2 is a diagram of sensing circuitry that processes the signals from the sensing pad of FIG. 1.

With reference to FIG. 2, the outputs of the sensing pad 10 are selected, as described below, by a switching unit 18 whose output in turn is fed to an amplifier 20. The output of the amplifier 20 is rectified by a rectifier 22 whose output is passed through a low pass filter 24 to remove the ripple component thereof. The resulting DC signal is passed through an offset amplifier 26 and converted to a digital signal by a digital-analog converter 28. The digital signal is then processed by a digital data processor as described below.

Returning to FIG. 1, the signal induced in a set of the sensing conductors in the sensing area 10A of the pad 10 is essentially proportional to the capacitance between the stylus and that set of conductors, assuming that the circuit of FIG. 2 applies a suitable load impedance to the conductor sets. Thus if the right hand sets of conductors 14R and 16R is connected by the switching unit 18 to the amplifier 20, and the left hand sets of conductors 14L and 16L are connected to ground, the output voltage of the amplifier will reflect the capacitance between the stylus and that set of conductors.

This capacitance is essentially proportional to the area of that set of conductors in proximity to the tip of the stylus and the area in turn is proportional to the conductor widths in that region. The widths of the right-hand conductors increase linearly with the X coordinate. Accordingly the coupling capacitance between the stylus and this set of conductors also increases linearly with the X coordinate, as does the output voltage of the amplifier 20 and the resulting output of the digital-to-analog converter 28.

Furthermore, while the widths of the individual right-hand conductors vary in the Y direction, the sum of the widths of successive right-hand conductors is essentially independent of the Y position. Accordingly, the coupling capacitance between the stylus 12 and right hand conductors is essentially independent of the Y position, as is the resulting output of the position sensor.

The output does, of course, depend on such factors as the height of the stylus tip above the surface of the sensing pad and variations in the voltage applied to the electrode in the stylus tip 12A. Accordingly, the output of the sensor is normalized to eliminate these factors. This is accomplished by making a second reading, this time with the left-hand sets of sensing conductors connected by the switching unit 18 to the amplifier 20 and the right-hand conductors grounded. The sum of the left-hand and right-hahd readings then provides the reference, and the X position of the stylus is given by the ratio of the right-hand reading to the sum of the left- and right-hand readings. This calculation is accomplished by the processor 30, which also controls the switching unit 18 to make the appropriate connections of the sensing conductors to the amplifier 20.

The Y position of the stylus 12 is determined in similar fashion. The switching unit 18 connects the amplifier 20 to the the conductors in the ascending sets 14 (terminals RA and LA) and grounds the descending sets 16 (terminals RD and LD). The widths of the conductor pairs in the ascending sets 14 increase linearly with the Y coordinate and are constant in the X direction. Accordingly the coupling capacitance between the stylus and the ascending sets 14 is proportional to the Y coordinate and independent of the X coordinate. Again two readings are made, one with the ascending sets connected to the amplifier 20 and a second, for normalization, with the descending sets connected to the amplifier 20. The Y position is then given by the ratio of the first reading to the sum of the two readings.

The signals induced in the sensing conductors have a finite value at the edges of the sensing area 10a. It is desirable that the output of the converter 28 be zero at reference coordinate positions, i.e. the left-hand and bottom edges of the sensing area in the example described herein. Accordingly an offset signal is added as an input to the amplifier 26 to provide the desired condition. This is readily accomplished during the manufacturing process by positioning the stylus at a reference coordinate and adjusting a potentiometer 32 to bring the output of the converter 28 to zero.

As an example of a position sensor embodying the present invention, I have constructed a sensing pad with a sensing area of 8.5 inches in the X direction by 11 inches in the Y direction. The sensing conductors have bases that vary from a maximum of 0.2 inch to 0.04 inch in 0.005 inch increments. The electrode in the stylus tip 12A has a diameter of 3/16 inch and is set back from the extremity of the tip by ½ inch. With this arrangement there is essentially no cogging effect as the stylus is moved in the Y direction.

The frequency of the sensing signal should be sufficiently high to couple a strong signal to the sensing pad. A relatively high frequency also facilitates rejection of potentially interfering signals picked up by the pad 10. I have found that a frequency of 20 kHz is satisfactory for both purposes.

Thus I have described a position sensor that is accurate and yet capable of low cost manufacture. It makes use of a conductor arrangement that lies entirely in a single layer and thus can be manufactured at low cost. At the same time it incorporates a relatively simple switching arrangement requiring only four connections to the switching unit. It will be understood that various modifications may be made in the position sensor without departing from the invention. For example, signals might be generated in the board and picked up by the stylus.

What is claimed as new and desired to be secured by Letters Patent of the United States is:

1. A position sensor comprising a stylus and a sensing pad, said sensing pad having an array of generally parallel planar sensing conductors,
   A. each of said conductors having a relatively wide base end and decreasing in width to a relatively narrow apex end,
   B. said conductors being arranged in complementary pairs, each pair having
      1. a first conductor whose base end is disposed at a first edge of said pad and whose apex end is disposed at a second edge opposite said first edge and
      2. a second conductor whose apex end is disposed at said first edge and said base end is disposed at said second edge,
   C. an ascending set of said conductor pairs in which the widths of said pairs vary from a minimum at a third edge of said pad to a maximum at a fourth edge opposite third edge, and
   D. a descending set of said conductor pairs, interleaved with said ascending set and in which the widths of said conductor pairs vary from a maximum at said third edge to a minimum at said fourth edge.

2. The sensor defined in claim 1 in which said sensing pad includes conductors connecting together in separate sets
   A. said first conductors in said ascending set,
   B. said second conductors in said ascending set,
   C. said first conductors in said descending set, and
   D. said second conductors in said descending set.

3. The position sensor defined in claim 2 including
   A. circuitry for the measurement of energy coupled between said stylus and selected sets of said sensing pad conductors
   B. switching means for connecting, in separate steps, for said energy measurement
      1. all of said first conductors,
      2. all of said second conductors
      3. all of said ascending set of conductors
      4. all of said descending set of conductors.

* * * * *